United States Patent
Thomas et al.

(10) Patent No.: US 6,640,088 B2
(45) Date of Patent: Oct. 28, 2003

(54) METHOD AND SYSTEM FOR ADAPTIVE CHANNEL ESTIMATION TECHNIQUES

(75) Inventors: Timothy A. Thomas, Palatine, IL (US); Xiangyang Zhuang, Hoffman Estates, IL (US); Frederick W. Vook, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 28 days.

(21) Appl. No.: 10/017,731

(22) Filed: Dec. 14, 2001

(65) Prior Publication Data

US 2003/0114164 A1 Jun. 19, 2003

(51) Int. Cl.⁷ .................. H04B 17/00; H04L 27/06
(52) U.S. Cl. ................. 455/67.11; 455/67.14; 455/67.13; 455/67.16; 375/340; 375/148
(58) Field of Search ................. 455/67.1, 67.3, 455/452, 67.11–67.14; 375/340, 230, 148

(56) References Cited

U.S. PATENT DOCUMENTS 5,251,233 A * 10/1993 Labedz et al. .............. 375/230
6,501,747 B1 * 12/2002 Friedlander et al. ........ 375/148

OTHER PUBLICATIONS

M. D. Macleod, "Joint Detection and High Resolution ML Estimation of Multiple Sinusoids in Noise," in Proc. ICASSP 2001, Salt Lake City, Utah, May, 2001.

Bauguo Yang, Khaled Ben Letaief, Roger S. Cheng and Zhigang Cao; "Channel Estimation for OFDM Transmission in Multipath Fading Channels Based on Parametric Channel Modeling": IEEE Transactions on Communications, vol. 49, No. 3, Mar. 2001 pp. 467–479.

T. A. Thomas, Fred W. Vook, Kevin L Baum, "Least–Squares Multi–User Frequency–Domain Channel Estimation for Broadband Wireless Communication Systems," 37th Allerton Conference, Monticello, IL, Sep. 1999, 10 pages.

* cited by examiner

*Primary Examiner*—Edward F. Urban
*Assistant Examiner*—Lana Le
(74) *Attorney, Agent, or Firm*—Kenneth A. Haas (57) ABSTRACT

The invention provides a method of determining an adaptive channel estimation by providing a channel estimate, determining at least one channel condition, and determining an adapted channel estimate as a function of the channel estimate and the channel condition.

8 Claims, 4 Drawing Sheets

METHOD AND SYSTEM FOR ADAPTIVE CHANNEL ESTIMATION TECHNIQUES

FIELD OF THE INVENTION

In general, the invention relates to wireless communication systems. More specifically, the invention relates to cellular communications and in particular, to a method and system for channel estimation within cellular communications.

BACKGROUND OF THE INVENTION

For optimal reception of a digital signal over a broadband cellular channel, the channel to a desired transmitter must be determined. Because channels can consist of a number of multipath components or rays each with its own time of arrival and Doppler frequency, a channel estimator should determine the actual time of arrivals (TOA's), Doppler frequencies, and their corresponding complex gains. The channel estimator should also adapt to many different transmitting environments where there are a very large number of rays with a TOA spread and a Doppler frequency spread. A maximum likelihood (ML) channel estimation approach as is known in the art, may provide the best TOA and Doppler frequency estimates, however it lacks a closed form solution.

Prior art TOA estimators such as a TOA estimation using ESPRIT, are not robust to channel conditions with a large number of rays with a TOA spread and are not suitable for multi-user channel estimation. Other channel estimators may assume a worst-case channel and thus need to estimate many more parameters than is necessary under typical channel conditions.

Thus, there is a significant need for a method and device for improving multi-user channel estimation techniques that overcome the above disadvantages and shortcomings, as well as other disadvantages.

DETAILED DESCRIPTION OF A PREFERRED EMBODIMENT

Figure 1:
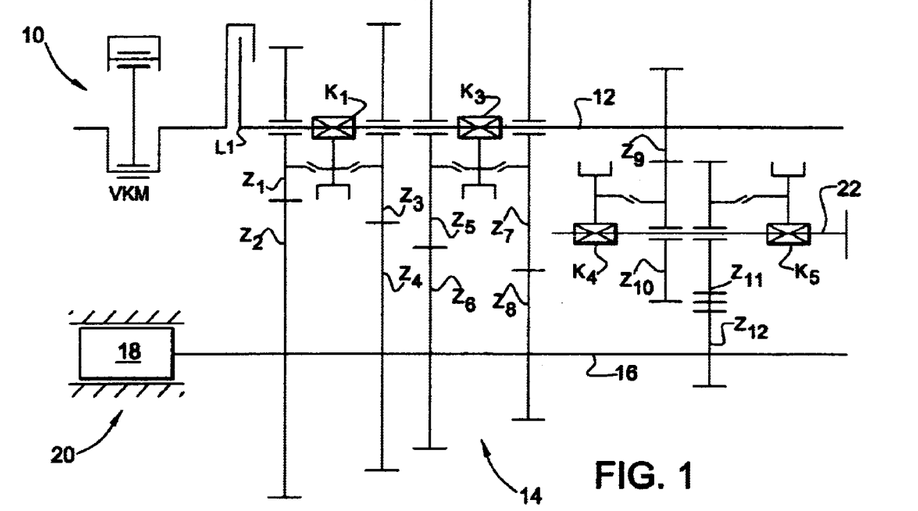
FIG. 1 is an overview diagram of a preferred embodiment for a cellular communication system in accordance with the present invention.

FIG. 1 illustrates a wireless communication system 100 in accordance with one embodiment of the present invention. As shown in FIG. 1, a base station 110 provides communication service to a geographic region known as a cell 103. At least one user device 120 and 130 communicate with the base station 110.

As shown in FIG. 1, user devices 120 have a single antenna 101, while user devices 130 have at least one antenna 101. One embodiment of the invention provides that the user devices 120 and 130, as well as the base station 110 may transmit, receive, or both from the at least one antenna 101. An example of this would be a typical cellular telephone. Additionally, one embodiment of the invention may provide that the communication system 100 uses techniques such as orthogonal frequency division multiplexing (OFDM). Furthermore, one embodiment may provide that alternative transmitters and receivers known in the art may be used and user devices as well as base stations may be interchanged and referred to commonly as communication devices, transmitting units, receiving units, transmitters, receivers, transceivers, cell phones, or any like term known in the art.

Figure 2:
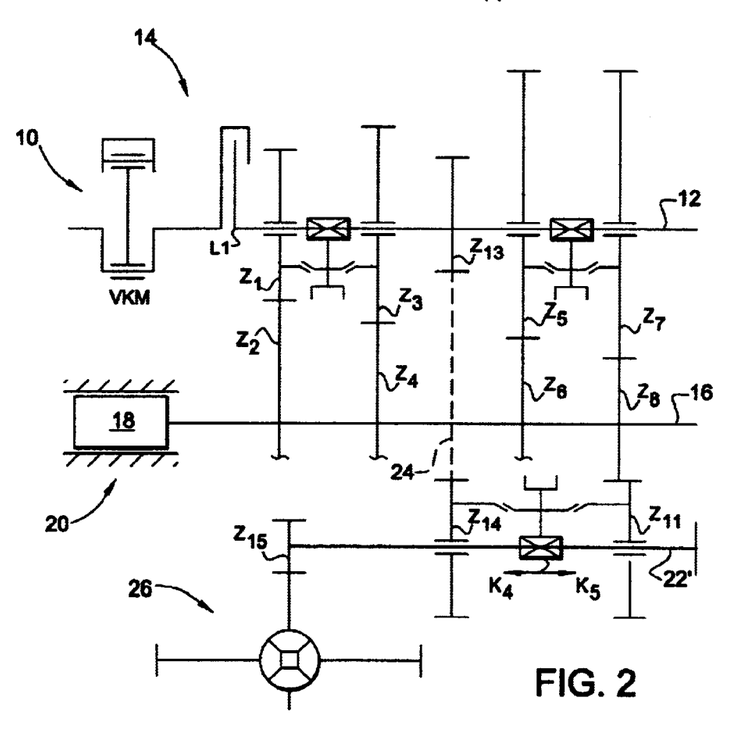
FIG. 2 is a block diagram illustration of a communication device for the cellular communication system in FIG. 1, in accordance with the present invention.

Illustrated in FIG. 2 is a block diagram for one embodiment of a communication device 200 that may be used within the wireless communication system. The communication device 200 may include at least one antenna 101 wherein the outputs of the antenna may be provided to a receiving unit 201. The outputs of the receiving unit 201 may be provided to at least one antenna combiner 202. The antenna combiner 202 may process multiple signals into one signal. The signals from the receiving units 201 may also be fed into a combiner controller 210, which can regulate the operation of the at least one antenna combiner 202. The signals from the receiving units 201 may also be fed into a channel estimation device 208. A pilot symbol generator 212 capable of generating pilot symbol information may be used by the combiner controller 210 to control the antenna combiner 202. The pilot symbol information generated by the pilot symbol generator 212 can also be used by the channel estimation device 208 to estimate the channel responses between a transmitting device and the communication device 200. The output of the antenna combiner 202 may be fed into an information decoding unit 206, which can decode an antenna combiner output 204 and generate data information 213 that was received by the antennas 101.

Figure 3:
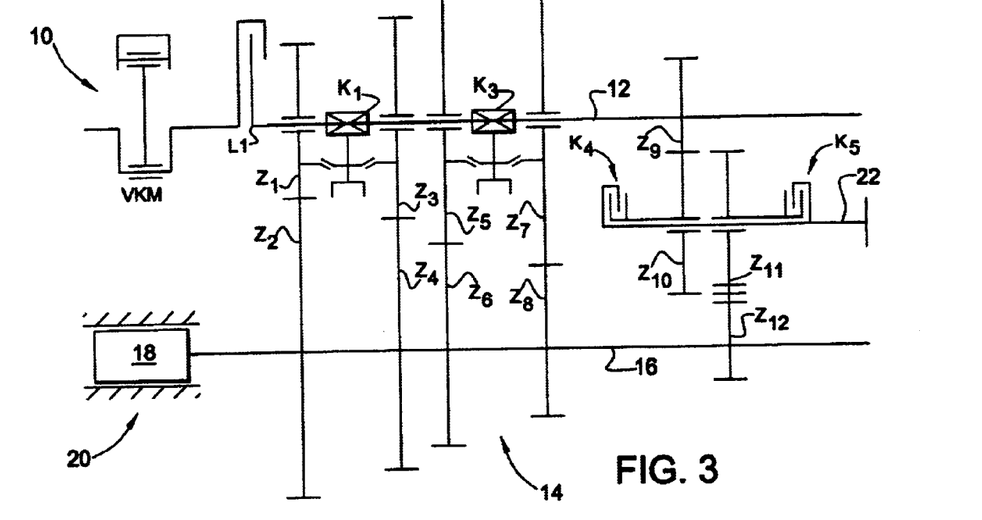
FIG. 3 is a block diagram illustrating details of a channel estimation device for the communication device of FIG. 2, in accordance with the present invention.

A channel estimation device 300 suitable for use in one embodiment of the communication device is illustrated within FIG. 3. One embodiment of the channel estimation device 300 may include a received training memory unit 310, capable of storing output signals from a receiving unit. A microprocessor 340 may collect the pilot sequence information from a pilot sequence input 350 and may receive inputs from a TOA matrices memory unit 320. The received data stored in the received training memory unit 310, and the inputs from the microprocessor 340 may be fed into a matrix multiplier 330 where they are multiplied. The result can be used in iteration calculations to compute a channel estimate in one embodiment of the invention. In another embodiment of the invention, the TOA matrices memory unit 320, the matrix multiplier 330, and the microprocessor 340 may be implemented in a processor 380. Additionally, an embodiment of the invention may provide the microprocessor 340 to make use of a Fast Fourier Transform device 390 to efficiently implement the channel estimation algorithms of the invention.

Figure 4:
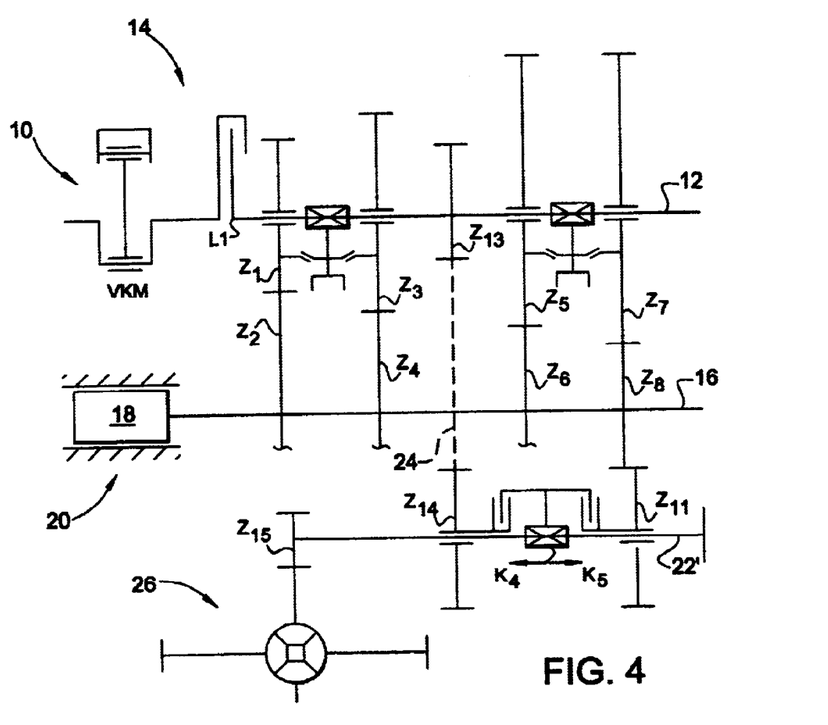
FIG. 4 is a flow chart representation of a method performed by one embodiment of the Channel Estimation Device of FIG. 3, in accordance with the present invention.

FIG. 4 is an illustration of a block diagram for a frequency-domain multi-user channel estimation method 400 in accordance with the invention. In order to describe the method of frequency-domain multi-user channel estimation 400, multi-user channel estimation based on time of arrivals (TOAs) for multi-path components of a transmitted signal will first be described.

Using prior art TOA estimators such as estimation of signal parameters via rotational invariance techniques (ESPRIT), TOA's for use in OFDM channel estimation may be found; however, ESPRIT fails when there are many multipath arrival times, or when the communication system is multi-user. In addition, ESPRIT is not an optimal TOA estimator since it is not a maximum likelihood (ML) estimator. The performance of ESPRIT may also suffer when the pilot symbols are not constant modulus. This can occur when the received signals need to be divided by the pilot symbols, which can result in an emphasis on subcarriers where the pilot is weaker in power.

In one embodiment of the invention, a near-ML technique for multiple sinusoidal estimation may be extended to a multiple user TOA/channel estimation in OFDM or for any frequency-domain channel. The received OFDM signal in the frequency-domain may be given as:

$$(M \times 1) Y(k) = \sum_{u=1}^{U} H_u(k) x_u(k) + N(k) \qquad (1)$$

where M is the number of receive antennas, U is the number of users or transmitters, $H_u(k)$ (an M×1 vector) is user u's channel on subcarrier k, $x_u(k)$ is user u's symbol on subcarrier k, and N(k) is a vector of additive noise that may have covariance matrix $\sigma_n^2 I$ where $\sigma_n^2$ is the noise power. The dependence on time (or baud number) has been removed to simplify the detailed description. User u's channel on antenna m may be modeled by the equation:

$$H_{m,u}(k) = f_u^H(k) \gamma_{m,u} \qquad (2)$$

where the $P_u \times 1$ vector, $\gamma_{m,u}$, is user u's channel gains on antenna m, $P_u$ is the number of distinct TOA estimates for user u, and the $P_u \times 1$ vector $f_u(k)$ may be represented by the equation:

$$f_u(k) = \begin{bmatrix} e^{jt_{u,1}k} \\ \vdots \\ e^{jt_{u,P_u}k} \end{bmatrix} \qquad (3)$$

In equation (3), $t_{u,l}$ is the scaled TOA (i.e., not the actual TOA) for user u and path l (l=1, ..., $P_u$). The true TOA's can be recovered by multiplying $t_{u,l}$ by $K/(2\pi W)$ where W is the bandwidth of the K subcarriers.

For one embodiment of the invention, equation (2) is essentially a sum of weighted sinusoids. The sinusoidal frequencies of equation (2) (which correspond to the TOA's) and their relative gains need to be determined to establish the channel estimation. Also, the TOA's corresponding to a single user may be assumed to be the same across the receive antennas. If hardware implementations cause the synchronization to be different on each receive antenna or cause the delay to be different due to filtering effects, then the TOA estimator may need to be run separately on each receive antenna.

Stacking the received frequency-domain signal on antenna m across K subcarriers may be expressed as:

$$(K \times 1) Y_m = \begin{bmatrix} Y_m(0) \\ \vdots \\ Y_m(K-1) \end{bmatrix} = \sum_{u=1}^{U} X_u F_u \gamma_{m,u} + N_m \qquad (4)$$

where K×K $X_u$ and K×$P_u$ $F_u$ are:

$$X_u = diag\{x_u(0), \ldots, x_u(K-1)\} \text{ and } F_u = \begin{bmatrix} f_u^H(0) \\ \vdots \\ f_u^H(K-1) \end{bmatrix}. \qquad (5)$$

Within another embodiment of the invention, the goal of channel estimation may be to find for each user the number of TOA's, $P_u$, the TOA's themselves, $t_{u,l}$, and their gain values, $\gamma_{m,l}$. A multi-dimensional search over all of these unknown parameters to find the best fit according to (4) may be a prohibitively complex task. Therefore the problem can be separated into two more tractable problems where the gains can be eliminated from the estimation problem and then a search can be performed just over the number of TOA's and the TOA's themselves. To determine the gains, a Least Squares (LS) approach may be taken with a weighting, $\alpha$, placed on the magnitudes of $\gamma_{m,l}$ so that the inverse in the following equation (7) is not ill conditioned. For the following equation (6), when $\alpha=0$ the solution is the ML estimator. The previously described parameters may be found as the solution to the equation:

$$\min_{t_l, P_u, \gamma_{m,u}} \sum_{m=1}^{M} \left| Y_m - \sum_{u=1}^{U} X_u F_u \gamma_{m,u} \right|^2 + \alpha \sum_{m=1}^{M} \sum_{u=1}^{U} \gamma_{m,u}^H \gamma_{m,u} \qquad (6)$$

The solution of (6) for the magnitude vectors, $\gamma_{m,l}$, given the TOA estimates can be shown to be:

$$(P \times 1) \gamma_m = \begin{bmatrix} \gamma_{m,l} \\ \vdots \\ \gamma_{m,U} \end{bmatrix} = R^{-1} H_m \qquad (7)$$

where $P = \sum_{u=1}^{U} P_u$, and $P \times PR$ and $P \times 1 H_m$ are given as:

$$R = \begin{bmatrix} R_{1,1} & \cdots & R_{1,U} \\ \vdots & \ddots & \vdots \\ R_{1,U}^H & \cdots & R_{U,U} \end{bmatrix} \text{ and } H_m = \begin{bmatrix} F_1^H X_1^H Y_m \\ \vdots \\ F_U^H X_U^H Y_m \end{bmatrix} \qquad (8)$$

and $P_u \times P_v R_{u,v}$ is given as:

$$R_{u,v} = F_u^H X_u^H X_v F_v + \alpha \delta(u-v) I_{P_u \times P_v} \qquad (9)$$

where $I_{n \times m}$ is an n×m matrix of all zeros except the upper left min(n,m)×min(n,m) corner which is an identity matrix of size min(n,m)×min(n,m) and $\delta(n)=1$ when n=0 and $\delta(n)=0$ when n≠0.

The mean squared error of the channel estimator can be shown to be:

$$E = \sum_{m=1}^{M} |Y_m|^2 - \sum_{m=1}^{M} H_m^H R^{-1} H_m \qquad (10)$$

The error does not depend on $\gamma_{m,l}$ and thus the TOA's can be searched independently of the gain values. This leads to the near-ML TOA search described below. At each step in the algorithm, a two-dimensional search may be performed to find an additional TOA and the user to which it belongs so that the MSE in equation (10) can be minimized. Because only a single TOA is added during an iteration of equation (10), $R^{-1}$ may be updated at each step by using the rank one inverse update formula (the rank one inverse update formula is known in the art). By only adding a single user's TOA at each step, the algorithm can accommodate the case of each user having a different number of TOA's.

The following is the near-ML multi-user TOA search, and [] is used to represent an empty matrix. First, let K×1 $G_{u,m}$ and K×1 $z_u(t)$ be:

$$G_{u,m} = X_u^H Y_m \text{ and } z_u(t) = \begin{bmatrix} 1 \\ e^{-jt} \\ \vdots \\ e^{-j(K-1)t} \end{bmatrix} \qquad (11)$$

1. $E_0 = \sum_{m=1}^{M} |Y_m|^2$, $l = 0$, $R_0^{-1} = []$, $r_0 = []$, $F_0 = []$, $H_0 = []$, $q_0 = []$, and $d_u = \alpha + \sum_{l=0}^{K-1} |x_u(k)|^2$ for $u = 1, \ldots, U$.

2. $l = l + 1$, $(l-1) \times 1 r_l = F_{l-1}^H X_{u_l} z_{u_l}(t_l)$, $$E_l = E_{l-1} - \frac{\sum_{m=1}^{M} q_{l,m}^H q_{l,m}}{d_{u_l} - r_l^H R_{l-1}^{-1} r_l}$$

where $$(l \times 1) q_{l,m} = \begin{bmatrix} -H_{m,l-1}^H R_{l-1}^{-1} r_l \\ G_{u,m}^H z_{u_l}(t_l) \end{bmatrix}.$$

Perform a two dimensional search over $t_l$ and $u_l$ ($u_l$ is which user's TOA minimizes $E_l$) and find the $t_l$ and $u_l$ to minimize $E_l$ and then update:

$$(l \times 1) H_{m,l} = \begin{bmatrix} H_{m,l-1} \\ z_{u_l}^H(t_l) G_{u_l,m} \end{bmatrix}, F_l = [F_{l-1} | X_u z_{u_l}(t_l)], \text{ and}$$

$$R_l^{-1} = \begin{bmatrix} R_{l-1}^{-1} & 0 \\ 0^T & 0 \end{bmatrix} + \frac{\begin{bmatrix} -R_{l-1}^{-1} r_l \\ 1 \end{bmatrix} [-r_l^H R_{l-1}^{-1} \quad 1]}{d_{u_l} - r_l^H R_{l-1}^{-1} r_l}.$$

3. If stop criteria as described below is not reached then go back to step 2.

4. The total number of TOA's, P, is l, the TOA's are $t_1$ through $t_l$, and the users associated with each TOA are $u_1$ through $u_l$. For one embodiment of the invention, the search over TOA's, $t_l$, performed in step 2 may be done over some finite set of times from $t_{min}$ to $t_{max}$. Since there are a finite number of TOA's to search over, $r_l$ and $G_{u,m}^H z_{u_l}(t_l)$ can be pre-computed.

In one embodiment of the invention, the stopping criteria may be to stop when the error at step 1, $E_l$, is close to the noise floor. This embodiment of course, requires an estimate of the noise power. Another embodiment of the invention may define the stopping criteria as "stop if the value of the Peak to Average Power Ratio (PAPR) of the error update at step 1 versus all of the TOA's being searched is less than some predetermined threshold". The error update at step 1 may be expressed as the equation $$e_l = \frac{\sum_{m=1}^{M} q_{l,m}^H q_{l,m}}{d_{u_l} - r_l^H R_{l-1}^{-1} r_l}.$$

An example of a preferred embodiment may set the predetermined threshold to five. The PAPR stop criteria can provide a value for $\sigma_n^2$ by dividing $E_l$ by MK. An example of this is the mean squared error averaged over all M antennas and all K subcarriers. Additionally, once the TOA's are found, the channel gains, $\gamma_m$, can be found using equation (7).

One embodiment of the invention may extend the previous algorithm to both TOA and Doppler frequency estimation. The received OFDM signal in the frequency-domain may be expressed as the equation:

$$(M \times 1) Y(k, b) = \sum_{u=1}^{U} H_u(k, b) x_u(k, b) + N(k, b) \qquad (12)$$

where M is the number of receive antennas, U is the number of users or transmitters, $H_u(k,b)$ is user u's channel on subcarrier k on baud number b, $x_u(k,b)$ is user u's symbol on subcarrier k and baud b, and N(k,b) is a vector of additive noise with covariance matrix $\sigma_n^2 I$. User u's channel on antenna m may be modeled by the equation:

$$H_{m,u}(k,b) = f_u^H(k,b) \gamma_{m,u} \qquad (13)$$

where $P_u \times 1$ $\gamma_{m,u}$ is user u's channel gains on antenna m, $P_u$ is the number of TOA and Doppler frequency estimates for user u, and $P_u \times 1$ $f_u(k,b)$ may be expressed as:

$$f_u(k, b) = \begin{bmatrix} e^{j(t_{u,1}k - f_{u,1}b)} \\ \vdots \\ e^{j(t_{u,P_u}k - f_{u,P_u}b)} \end{bmatrix} \qquad (14)$$

where $t_{u,l}$ and $f_{u,l}$ in (14) are the scaled TOA and Doppler frequency respectively, for user u and path l ($1 \leq l \leq P_u$). Within one embodiment of the invention, the true TOA's can be recovered by multiplying $t_{u,l}$ by $K/(2\pi W)$ where W is the bandwidth of the K subcarriers. Additionally, the true Doppler frequencies can be recovered by dividing $f_{u,l}$ by $2\pi \Delta N_s$ where $\Delta$ is the time between OFDM time-domain samples and $N_s$ is the number of time samples between two adjacent OFDM bauds such as the number of samples between bauds b and b+1.

For a fixed b, equation (13) is essentially a sum of weighted sinusoids just like the TOA-only embodiment. For channel estimation within another embodiment, the sinusoidal frequencies across frequency (these correspond to the TOA's), the sinusoidal frequencies across time (these correspond to the Doppler frequencies), and their relative gains may need to be determined. Further, the TOA's and Doppler frequencies may be assumed to be the same across the receive antennas for a single user. If hardware implementations cause the synchronization to be different on each receive antenna, cause the delay to be different due to filtering effects, or cause the frequency offsets to be different, then the TOA/Doppler frequency estimator may need to be run separately on each receive antenna.

Another embodiment of the invention may assume that there are B bauds containing all known pilots on all K subcarriers. The extension to arbitrary pilot formats is straightforward to anyone trained in the art. Stacking the received frequency-domain signal on antenna m across K subcarriers and B pilot bauds gives the following equation:

$$(KB \times 1)Y_m = \begin{bmatrix} Y_m(0,0) \\ \vdots \\ Y_m(K-1,0) \\ Y_m(0,1) \\ \vdots \\ Y_m(K-1,B-1) \end{bmatrix} = \sum_{u=1}^{U} X_u F_u \gamma_{m,u} + N_m \quad (15)$$

where $BK \times BK$ $X_u$ and $BK \times P_u$ $F_u$ are:

$$X_u = \quad (16)$$
$$diag\{x_u(0,0), \ldots, x_u(K-1,0), x_u(0,1), \ldots, x_u(K-1,B-1)\}$$

$$\text{and } F_u = \begin{bmatrix} f_u^H(0,0) \\ \vdots \\ f_u^H(K-1,0) \\ f_u^H(0,1) \\ \vdots \\ f_u^H(K-1,B-1) \end{bmatrix}$$

For one embodiment of the invention, the goal of channel estimation may be to find for each user the number of TOA's/Doppler frequencies, $P_u$, the TOA's and Doppler frequencies themselves, $t_{u,l}$ and $f_{u,l}$, and their gain values, $\gamma_{m,l}$. To determine the gains, a Least Squares (LS) approach may be taken with a weighting, $\alpha$, placed on the magnitudes of $\gamma_{m,l}$ so that the inverse in the following equation (18) is not ill conditioned. It is obvious that when $\alpha=0$ the solution to the following equation (17) is the ML estimator. The parameters are found as the solution to:

$$\min_{t_l, f_l, P_u, \gamma_{m,u}} \sum_{m=1}^{M} \left| Y_m - \sum_{u=1}^{U} X_u F_u \gamma_{m,u} \right|^2 + \alpha \sum_{m=1}^{M} \sum_{u=1}^{U} \gamma_{m,u}^H \gamma_{m,u} \quad (17)$$

The solution of equation (17) for the magnitude vectors, $\gamma_{m,l}$, given the TOA and Doppler frequency estimates can be shown to be:

$$(P \times 1)\gamma_m = \begin{bmatrix} \gamma_{m,1} \\ \vdots \\ \gamma_{m,U} \end{bmatrix} = R^{-1} H_m \quad (18)$$

where $$P = \sum_{u=1}^{U} P_u,$$

and $P \times P$ R and $P \times 1$ $H_m$ are given as:

$$R = \begin{bmatrix} R_{1,1} & \cdots & R_{1,U} \\ \vdots & \ddots & \vdots \\ R_{1,U}^H & \cdots & R_{U,U} \end{bmatrix} \text{ and } H_m = \begin{bmatrix} F_1^H X_1^H Y_m \\ \vdots \\ F_U^H X_U^H Y_m \end{bmatrix} \quad (19)$$

and $P_u \times P_v$ $R_{u,v}$ is given as:

$$R_{u,v} = F_u^H X_u^H X_v F_v + \alpha \delta(u-v) I_{P_u} \quad (20)$$

The mean squared error (MSE) of the channel estimator can be shown to be:

$$E = \sum_{m=1}^{M} |Y_m|^2 - \sum_{m=1}^{M} H_m^H R^{-1} H_m \quad (21)$$

In one embodiment of the invention, the error may not depend on $\gamma_{m,l}$ and thus the TOA's and Doppler frequencies can be searched independently of the gain values. This leads to a near-ML TOA/Doppler frequency search. At each step in the algorithm, a three-dimensional search may be performed to find an additional TOA, an additional Doppler frequency, and the user to which they belong so that the MSE in equation (21) is minimized. Because only a single TOA/Doppler frequency pair is added during an iteration of equation (21), $R^{-1}$ can be updated at each step by using the rank one inverse update formula, as is known in the art. By only adding a single user's TOA/Doppler frequency pair at each step, the algorithm can accommodate an embodiment of the invention where each user may have a different number of TOA's and Doppler frequencies. The following procedure may provide the near-ML multi-user TOA/Doppler frequency search, where [] is used to represent an empty matrix. First, let $BK \times 1$ $G_{u,m}$ and $BK \times 1$ $z_u(t,f)$ be:

$$G_{u,m} = X_u^H Y_m \text{ and } z_u(t,f) = \begin{bmatrix} e^{-j(0t-0f)} \\ \vdots \\ e^{-j((K-1)t-0f)} \\ e^{-j(0t-f)} \\ \vdots \\ e^{-j((K-1)t-(B-1)f)} \end{bmatrix} \quad (22)$$

1. $E_0 = \sum_{m=1}^{M} |Y_m|^2$, $l = 0$, $R_0 = []$, $r_0 = []$, $F_0 = []$, $H_0 = []$, $q_0 = []$, and $d_u = \alpha + \sum_{b=0}^{B-1} \sum_{l=0}^{K-1} |x_u(k,b)|^2$ for $u = 1, \ldots, U$.

-continued

2. $l = l+1$, $(l-1) \times 1 r_l = F_{l-1}^H X_{u_l} z_{u_l}(t_l, f_l)$, $$E_l = E_{l-1} - \frac{\sum_{m=1}^{M} q_{l,m}^H q_{l,m}}{d_{u_l} - r_l^H R_{l-1}^{-1} r_l}$$

where $(l \times 1) q_{l,m} = \begin{bmatrix} -H_{m,l-1}^H R_{l-1}^{-1} r_l \\ G_{u,m}^H z_{u_l}(t_l, f_l) \end{bmatrix}$.

Perform a three dimensional search over $t_l$, $f_l$, and $u_l$ (which user's TOA/Doppler frequency pair minimizes $E_l$) and find the $t_l$, $f_l$, and $u_l$ to minimize $E_l$ and then update:

$$(l \times 1) H_{m,l} = \begin{bmatrix} H_{m,l-1} \\ z_{u_l}^H(t_l, f_l) G_{u_l,m} \end{bmatrix}, F_l = [F_{l-1} \mid X_u z_{u_l}(t_l, f_l)], \text{ and}$$

$$R_l^{-1} = \begin{bmatrix} R_{l-1}^{-1} & 0 \\ 0^T & 0 \end{bmatrix} + \frac{\begin{bmatrix} -R_{l-1}^{-1} r_l \\ 1 \end{bmatrix} [-r_l^H R_{l-1}^{-1} \; 1]}{d_{u_l} - r_l^H R_{l-1}^{-1} r_l}.$$

3. If stop criteria as described below is not reached then go back to step 2.

4. The total number of TOA's and Doppler frequencies P is l, the TOA's are $t_1$ through $t_l$, the Doppler frequencies are $f_1$ through $f_l$, and the users associated with each TOA are $u_1$ through $u_l$.

For another embodiment of step two, the search over TOA's, $t_l$, may be performed over some finite set of times from $t_{min}$ to $t_{max}$ and the search over Doppler frequencies may also be performed over a finite set of frequencies from $f_{min}$ to $f_{max}$. Since there are a finite number of TOA's and Doppler frequencies to search over, $r_l$ and $G_{u,m}^H z_{u_l}(t_l, f_l)$ may be pre-computed.

One embodiment of the invention may provide for the stopping criteria to stop when the error at step l, $E_l$, is close to the noise floor. That embodiment of course, requires an estimate of the noise power. Another embodiment of the invention may provide the stopping criteria to quit when the Peak to Average Power Ratio (PAPR) of the error update at step l versus all of the time of arrivals and Doppler frequencies being scanned is less than some predetermined value. The error update at iteration l may be expressed as $$e_l = \frac{\sum_{m=1}^{M} q_{l,m}^H q_{l,m}}{d_{u_l} - r_l^H R_{l-1}^{-1} r_l}.$$

Dividing $E_l$ by MBK, a value for $\sigma_n^2$ may be obtained. Once the TOA's and Doppler frequencies are found, the channel gains, $\gamma_m$, can be found using equation (18).

Common among the embodiments of channel estimation methods in accordance with the present invention, is that each method adapts (is adaptive) to the channel conditions, thereby using a smaller set of channel parameters than existing channel estimators. The channel conditions may include multi-path components, channel gains of multi-path components, time-taps, maximum delay spread, directions of arrivals, and/or additional channel attributes as are known in the art. The adaptivity of the invention may be in part or whole, a function of channel estimation iteration, channel estimation TOA, and/or least squares channel estimation. Each method of adaptivity described within the detailed description of the invention may provide an adapted channel estimate in place of the received channel estimate thereby improving performance in most channel conditions. One such embodiment refers again to FIG. 4, where the frequency-domain multi-user channel estimation method 400 can provide multi-user TOA and Doppler frequency near-ML estimations.

The channel estimation method 400 may be provided a noisy channel estimate for at least one user $G_{u,m}$, and an update vector $z_u(t,f)$, 410 and may be represented by the equation:

$$G_{u,m} = X_u^H Y_m \text{ and } z_u(t, f) = \begin{bmatrix} e^{-j(0t-0f)} \\ \vdots \\ e^{-j((K-1)t-0f)} \\ e^{-j(0t-f)} \\ \vdots \\ e^{-j((K-1)t-(B-1)f)} \end{bmatrix}.$$

The iteration variables may next be initialized that may include setting the iteration number l, to zero 420. The iteration variables and how they are initialized may be represented by the equations $$E_0 = \sum_{m=1}^{M} |Y_m|^2, \ell = 0, R_0 = [], r_0 = [], F_0 = [], H_0 = [], q_0 = [], \text{ and}$$

$$d_u = \alpha + \sum_{b=0}^{B-1} \sum_{\ell=0}^{K-1} |x_u(k, b)|^2$$

for $u=1, \ldots, U$, where [] indicates an empty matrix as is known in the art. After initialization, the iteration number may be incremented by one 430. The channel estimation method 400 may then calculate an error update at the incremented iteration for all TOA values, Doppler values, and users being scanned as a function of the iteration variables and the noisy channel estimates for at least one user 440. In one embodiment of the invention the TOA's t may be scanned from $t_{min}$ to $t_{max}$, the Doppler frequencies f may be scanned from $f_{min}$ to $f_{max}$, and the users, u, may be scanned from one to U. The error update at iteration l can be a function of TOA, Doppler frequency, and user and for this embodiment may be equated as $$e_\ell(t, f, u) = \frac{\sum_{m=1}^{M} q_{\ell,m}^H q_{\ell,m}}{d_{u_\ell} - r_\ell^H R_{\ell-1}^{-1} r_\ell}, \text{ where}(\ell - 1) \times 1 r_\ell = F_{\ell-1}^H X_{u_\ell} z_{u_\ell}(t_\ell, f_\ell), \text{ and}$$

$$(\ell \times 1) q_{\ell,m} = \begin{bmatrix} -H_{m,\ell-1}^H R_{\ell-1}^{-1} r_\ell \\ G_{u,m}^H z_{u_\ell}(t_\ell, f_\ell) \end{bmatrix}.$$

Determining which t, f, and u that can maximize the error update at iteration l can be performed with the determined values labeled $t_l$, $f_l$, and $u_l$ respectively 450. The error at step l, $E_l$, may be updated to equate $E_l = E_{l-1} - e_l(t_l, f_l, u_l)$. Next, the following iteration variables may be updated 460:

$$(\ell \times 1) H_{m,\ell} = \begin{bmatrix} H_{m,\ell-1} \\ z_{u_\ell}^H(t_\ell, f_\ell) G_{u_\ell,m} \end{bmatrix}, F_\ell = [F_{\ell-1} \mid X_u z_{u_\ell}(t_\ell, f_\ell)], \text{ and}$$

-continued $$R_\ell^{-1} = \begin{bmatrix} R_{\ell-1}^{-1} & 0 \\ 0^T & 0 \end{bmatrix} + \frac{\begin{bmatrix} -R_{\ell-1}^{-1} r_\ell \\ 1 \end{bmatrix} [-r_\ell^H R_{\ell-1}^{-1} \; 1]}{d_{u_\ell} - r_\ell^H R_{\ell-1}^{-1} r_\ell}.$$

If the appropriate stopping criteria have been reached 470, the channel estimation method 400 may be terminated 480. If the appropriate stopping criteria have not been reached 470, then the channel estimation method 400 may proceed to block 430.

In another embodiment of FIG. 4, directions of arrivals can be scanned in a similar manner as the TOAs and the Doppler frequencies. Anyone skilled in the art can modify the channel estimator of FIG. 4 to scan for direction of arrivals in a near-ML sense.

Figure 5:
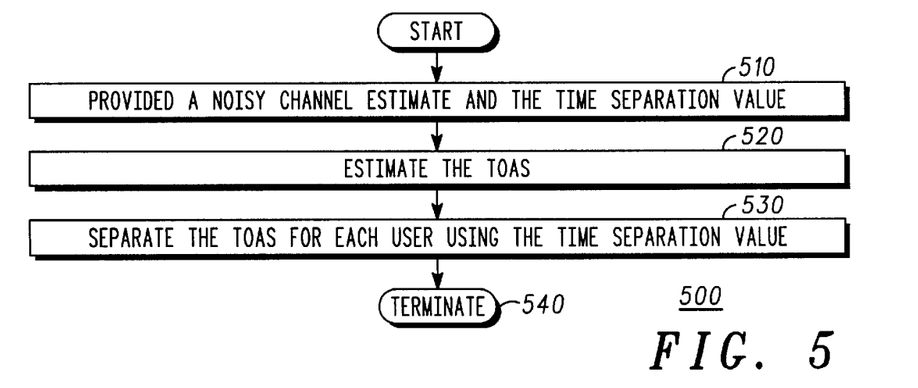
FIG. 5 is a flow chart representation of a method performed by a second embodiment of the Channel Estimation Device of FIG. 3, in accordance with the present invention.

Another embodiment of the invention illustrating an adaptive channel estimator is FIG. 5, where a TOA with a phase shift training channel estimation method 500 may provide channel estimation by shifting multiple user channels to non-overlapped time regions. Given that a first user's pilots are $p_1(k)$, then a subsequent users' pilots (say the $n^{th}$) may be determined as:

$$p_n(k) = p_1(k) e^{-j2\pi k(n-1)L_s/K} \tag{23}$$

where $L_s$ may represent the maximum length in number of time samples of all users' channel responses. The phase shift training channel estimation method 500 may begin by being provided a noisy channel estimate and a time separation value 510. The time separation value $L_s$ may be at least as long as the expected delay in sample times. The noisy channel estimate may be equated as $H_n(k)=Y(k)/p_1(k)$. The TOA's may be estimated next 520 from the noisy channel estimate using any existing TOA estimator known in the art. The use of the training in (23) may turn the multi-user TOA estimation problem stated previously in equation (6) to a single-user equivalent problem where a user u's TOA's can be from $(u-1)L_s\Delta N/K$ to $uL_s\Delta N/K$, and $\Delta$ may be the time between OFDM time-domain samples. The complexity is similar to the multi-user embodiment of FIG. 4 because the number of TOA's that need to be searched at each iteration using the phase shift training may be the same as before. Thus, the final step of the phase shift training channel estimation method 500 may be to separate the TOA's for each user given what time band they are in 530. For one embodiment of the invention, user u's TOAs are from $(u-1)L_s\Delta N/K$ to $uL_s\Delta N/K$. The phase shift training can enable the use of ESPRIT as a multi-user TOA estimator because the phase shift training problem can turn the multi-user TOA search into a single-user equivalent.

In another embodiment of the invention, a gradient search may be performed to improve the TOA estimates from any existing TOA estimator. This embodiment may provide that for a single user, the TOA estimation can be expressed as follows if the number of TOA's, P, is known:

$$\min_{t_\ell, \gamma_\ell} \sum_{k=0}^{K-1} \left| \sum_{\ell=1}^{P} \gamma_\ell e^{-jkt_\ell} - H_n(k) \right|^2 \tag{24}$$

where the (M×1) noisy channel estimate $H_n(k)$ is $H_n(k)=Y(k)/x(k)$ and $\gamma_l$ is a M×1 matrix of channel gains for the $l^{th}$ TOA. A gradient of equation (24) with respect to $t_l$ can be shown to be:

$$\nabla t_\ell = \tag{25}$$

$$\sum_{k=0}^{K-1} Im\{k e^{jkt_\ell} \gamma_\ell^H H_n(k)\} - \sum_{k=0}^{K-1} Im\left\{ \sum_{\substack{p=1 \\ p \neq \ell}}^{P} \gamma_\ell^H \gamma_p k e^{-jk(t_p - t_\ell)} \right\}.$$

Given the P TOA's, the gains $(P \times M)\gamma = [\gamma_1, \ldots, \gamma_P]^T$ may be found as $$\gamma = R^{-1} p \text{ where } R = \sum_{k=0}^{K-1} f(k) f^H(k), \tag{26}$$

$$p = \sum_{k=0}^{K-1} f(k) H^T(k), \text{ and } f(k) = \begin{bmatrix} e^{jkt_1} \\ \vdots \\ e^{jkt_P} \end{bmatrix}.$$

Consequently, one embodiment of the invention may provide a gradient-based search for the TOA's as follows:
1. Start with PTOA's from an existing algorithm (e.g., ESPRIT or the near-ML TOA algorithm).
2. Determine $\gamma$ from equation (26).
3. Calculate $\nabla t_l$ for l=1, ..., P from equation (25), for l=1, ..., P, $t_l = t_{l-\alpha \nabla tl}$ where $\alpha$ is the step size.
4. If the stopping criteria are not reached, such as a maximum number of iterations, then go to step 2.

Figure 6:
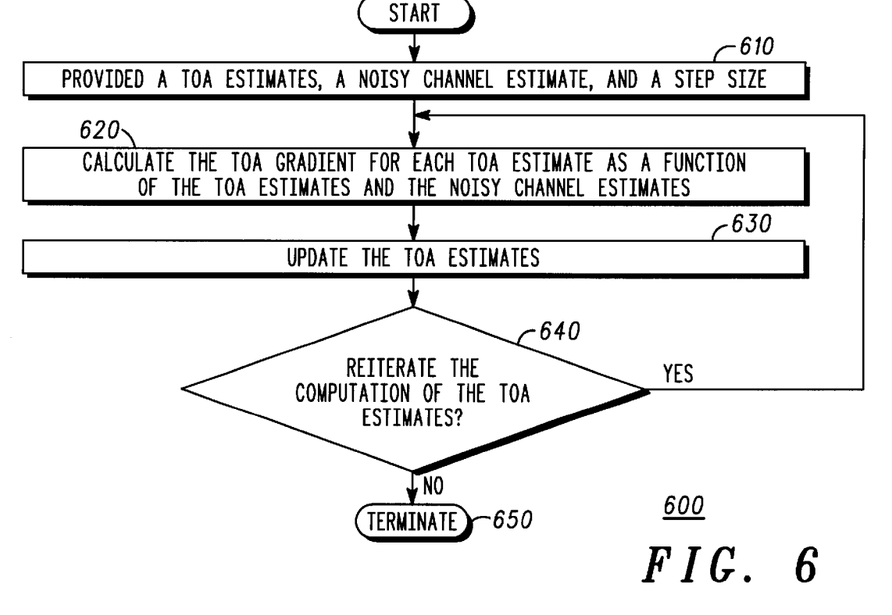
FIG. 6 is a flow chart representation of a method performed by a third embodiment of the Channel Estimation Device of FIG. 3, in accordance with the present invention.

FIG. 6 illustrates another embodiment of the invention using the gradient-based search for TOA's. The gradient TOA channel estimation method 600 may be provided a number, P, TOA estimates $t_l$ for l=1 ... P, and a step size $\alpha$ 610. A noisy channel estimate may be determined as the equation $H_n(k)=Y(k)/x(k)$. The TOA gradient for each TOA estimate may next be calculated as a function of the TOA estimates and the noise channel estimate 620. The TOA gradient for the $l^{th}$ TOA, $t_l$, can be shown as the equation $$\nabla t_\ell = \sum_{k=0}^{K-1} Im\{k e^{-jkt_\ell} \gamma_\ell^H H_n(k)\} - \sum_{k=0}^{K-1} Im\left\{ \sum_{\substack{p=1 \\ p \neq \ell}}^{P} \gamma_\ell^H \gamma_p k e^{-jk(t_p - t_\ell)} \right\},$$

where $(P \times M)\gamma = [\gamma_1, \ldots, \gamma_P]^T$, and $\gamma = R^{-1} p$ where $$R = \sum_{k=0}^{K-1} f(k) f^H(k),$$

$$p = \sum_{k=0}^{K-1} f(k) H^T(k), \text{ and } f(k) = \begin{bmatrix} e^{jkt_1} \\ \vdots \\ e^{jkt_P} \end{bmatrix}.$$

The TOA's can be updated for l=1 ... P using $t_l = t_l - \alpha \nabla t_l$ where $\alpha$ is the step size 630. If a stopping criterion is not reached 640 such as a maximum number of iterations is not reached, the iterations may continue from block 620, otherwise the algorithm may terminate 650. The gradient search may not be the preferred method to determine TOA's, but for one embodiment of the invention, the gradient search may refine estimates that are reasonably close. This is due to the objective function having many local minimums and that the gradient search does not provide a good procedure for determining P and the initial TOA's.

Figure 7:
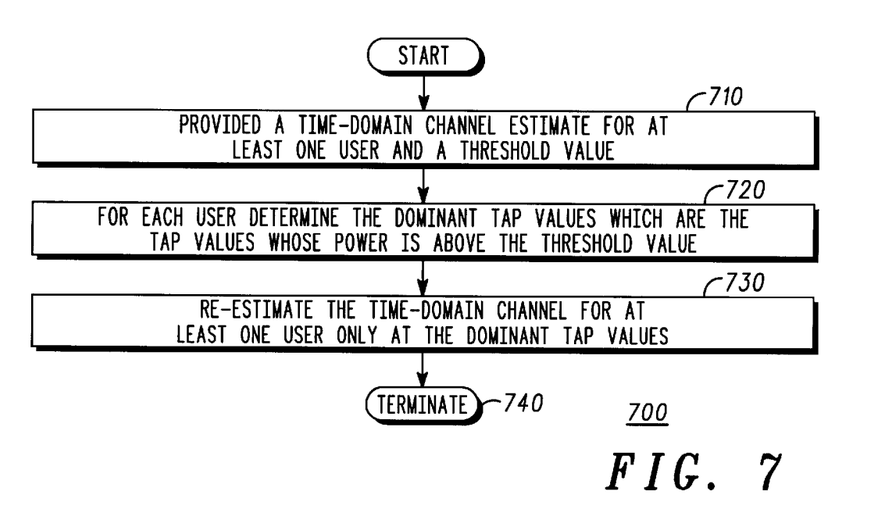
FIG. 7 is a flow chart representation of a method performed by a fourth embodiment of the Channel Estimation Device of FIG. 3, in accordance with the present invention.

As is illustrated in FIG. 7, another adaptive channel estimation embodiment of the invention can include an improved least squares channel estimation method 700. Assuming that there is only a single user, the least squares (LS) channel estimator can parameterize a frequency-domain channel as the weighted sum of L time taps, or equivalently the N-point DFT of an L-tap time-domain channel as follows:

$$H(k) = \sum_{\ell=0}^{L-1} h(\ell)e^{-j2\pi k\ell/N} \quad (27)$$

where N is the DFT size of the LS estimator (in OFDM, N≧K). The LS estimator for receive antenna m can be put in a matrix form as represented by the equation:

$$h_m = \begin{bmatrix} h_m(0) \\ \vdots \\ h_m(L-1) \end{bmatrix} = QY_m \quad (28)$$

where Q is L×K matrix that may provide a LS time-tap channel estimate as is known in the art, and $Y_m$ is defined in the previous equation (4) with U=1.

In sparse channels the LS estimator can be improved by not estimating gains for taps below a certain power level, thus improving the pilot-to-parameter ratio. In this embodiment of the invention, criteria may determine which taps are not estimated. Assuming that only white noise is present, the noise floor of the LS estimator can be represented by the equation:

$$\sigma_h = \sigma_n Qd \quad (29)$$

where d is an K×1 vector of all ones.

The criteria within one embodiment of the invention for the removal of taps may be to remove all taps with power below $10\log_{10}(\sigma_h^H \sigma_h)+5$ dB. Once the taps are removed, the gains can be found using a LS procedure similar to equation (7). Using the described process, the least squares channel estimation method 700 may begin by being provided a time-domain channel estimate for at least one user and a threshold value T710. In one embodiment of the invention, the threshold value may be represented by the equation $T=10\log_{10}(\sigma_h^H \sigma_h)+5$ dB, where $\sigma_h = \sigma_n Qd$, d is a K×1 vector of all ones, $\sigma_n^2$ is the noise power, and Q is a matrix that is known in the art which can provide a LS time-tap channel estimate. The time-domain channel estimate may be provided from any existing channel estimator. In the Least Squares (LS) embodiment, the time-domain channel estimate on receive antenna m may be given as:

$$h_m = \begin{bmatrix} h_m(0) \\ \vdots \\ h_m(L-1) \end{bmatrix} = QY_m,$$

where $$(K \times 1)Y_m = \begin{bmatrix} Y_m(0) \\ \vdots \\ Y_m(K-1) \end{bmatrix} = \sum_{u=1}^{U} X_u F_u \gamma_{m,u} + N_m.$$

Any time-domain channel taps whose magnitude is below the threshold value T, may be discarded by the invention in order to determine the dominant time-taps (time-taps values with power above the threshold value) 720. In one embodiment of the invention, the dominant time-taps may be the P time-taps labeled $1_1$ through $1_P$, and may represent 1 for which $|h_m(1)|^2 > T$. With the dominant time-taps determined, the least squares channel estimation method 700 may re-estimate the channel for at least one user, only at the dominant time-tap (tap) values 730. For the previously described embodiment, the dominant tap values can be $1_1$ through $1_P$, whose gains (channel estimations) may be found using a LS procedure similar to equation (7), thus terminating 740 the least squares channel estimation method 700

The above-described methods and implementation of adaptive channel estimation are example methods and implementations. These methods and implementations illustrate but one possible approach for adaptive channel estimation. The actual implementation may vary from the method discussed. Moreover, various other improvements and modifications to this invention may occur to those skilled in the art, and those improvements and modifications will fall within the scope of this invention as set forth below.

The present invention may be embodied in other specific forms without departing from its spirit or essential characteristics. The described embodiments are to be considered in all respects only as illustrative and not restrictive.

We claim:

1. A method for adaptive channel estimation comprising:
   providing a channel estimate;
   determining an at least one channel condition;
   determining an adapted channel estimate as a function of the channel estimate and the channel condition;
   initializing at least one iteration variable;
   calculating an error update as a function of die iteration variable; and
   determining the adapted channel estimate as a function of the error update.

2. The method of claim 1 further comprising:
   providing a threshold value;
   determining a dominant tap value as a function of the threshold value; and
   determining the adapted channel estimate as a function of the dominant cap value.

3. A method for adaptive channel estimation comprising:
   providing a channel estimate;
   determining an at least one channel condition;
   determining an adapted channel estimate as a function of the channel estimate and the channel condition;
   estimating a plurality of TOA values;
   separating the TOA values as a function of a time separation value; and
   determining the adapted channel estimate as a function of the separated TOA values.

4. A method for adaptive channel estimation comprising:
   providing a channel estimate;
   determining an at least one channel condition;
   determining an adapted channel estimate as a function of the channel estimate and the channel condition;
   estimating a plurality of TOA values;
   calculating a TOA gradient as a Function of the TOA values; and
   determining the adapted channel estimate us a function of the calculated TOA gradient.

5. A system for adaptive channel estimation comprising:
   means for providing a channel estimate;
   means for determining an at least one channel condition;
   means for determining an adapted channel estimate as a function of the channel estimate and the channel condition;

means for initializing at least one iteration variable;

means for calculating an error update as a function of the iteration variable; and means for determining the adapted channel estimate as a function of the error update.

6. The system of claim 5 further comprising:

means for providing a threshold value;

means for determining a dominant tap value as a function of the threshold value; and means For determining the adapted channel estimate as a function of the dominant tap value.

7. A system for adaptive channel estimation comprising:

means for providing a channel estimate;

means for determining an at least one channel condition;

means for determining an adapted channel estimate as a function of the channel estimate and the channel condition;

means for estimating a plurality of TOA values;

means for separating the TOA values as a function of a time separation value; and means for determining the adapted channel estimate as a function of the separated TOA values.

8. A system for adaptive channel estimation comprising:

means for providing a channel estimate;

means for determining an at least one channel condition;

means for determining an adapted channel estimate as a function of the channel estimate and the channel condition;

means for estimating a plurality of TOA values;

means for calculating a TOA gradient as a function of the TOA values; and means for determining the adapted channel estimate as a function of the calculated TOA gradient.

* * * * *

UNITED STATES PATENT AND TRADEMARK OFFICE
CERTIFICATE OF CORRECTION

PATENT NO. : 6,640,088 B2  Page 1 of 7
APPLICATION NO. : 10/017731
DATED : October 28, 2003
INVENTOR(S) : Timothy A. Thomas, Xiangyang Zhuang and Frederick W. Vook It is certified that error appears in the above-identified patent and that said Letters Patent is hereby corrected as shown below:

Please delete drawing figure on title page

Please insert on the title page the drawing figure that is illustrated as it is shown here attached Please delete drawing figure 1

FIG. 1

Please insert drawing figure 1 as illustrated below

FIG. 1

Please delete drawing figure 2

FIG. 2

Please insert drawing figure 2 as illustrated below

FIG. 2

CERTIFICATE OF CORRECTION (continued)
U.S. Pat. No. 6,640,088 B2

Please delete drawing figure 3

FIG. 3

Please insert drawing figure 3 as illustrated below

FIG. 3

Please delete drawing figure 4

FIG. 4

Please insert drawing figure 4 as illustrated below

FIG. 4

Column 14:

Line 30, claim 1 please delete "die" and replace with "the"
Line 39, claim 2 please delete "cap" and replace with "tap"
Line 56, claim 4 please delete "Function" and replace with "function"

Column 15:

Line 10, claim 6 please delete "For" and replace with "for"

Signed and Sealed this

Twelfth Day of January, 2010

David J. Kappos
*Director of the United States Patent and Trademark Office*

United States Patent
Thomas et al.

(10) Patent No.: US 6,640,088 B2
(45) Date of Patent: Oct. 28, 2003

(54) METHOD AND SYSTEM FOR ADAPTIVE CHANNEL ESTIMATION TECHNIQUES

(75) Inventors: Timothy A. Thomas, Palatine, IL (US); Xiangyang Zhuang, Hoffman Estates, IL (US); Frederick W. Vook, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 28 days.

(21) Appl. No.: 10/017,731

(22) Filed: Dec. 14, 2001

(65) Prior Publication Data

US 2003/0114164 A1 Jun. 19, 2003

(51) Int. Cl.[7] .................... H04B 17/00; H04L 27/06
(52) U.S. Cl. ................... 455/67.11; 455/67.14; 455/67.13; 455/67.16; 375/340; 375/148
(58) Field of Search ................ 455/67.1, 67.3, 455/452, 67.11–67.14; 375/340, 230, 148

(56) References Cited

U.S. PATENT DOCUMENTS 5,251,233 A * 10/1993 Labedz et al. ............ 375/230

6,501,747 B1 * 12/2002 Friedlander et al. ...... 375/148

OTHER PUBLICATIONS

M. D. Macleod, "*Joint Detection and High Resolution ML Estimation of Multiple Sinusoids in Noise*," in Proc. ICASSP 2001, Salt Lake City, Utah, May, 2001.

Bauguo Yang, Khaled Ben Letaief, Roger S. Cheng and Zhigang Cao; "*Channel Estimation for OFDM Transmission in Multipath Fading Channels Based on Parametric Channel Modeling*"; IEEE Transactions on Communications, vol. 49, No. 3, Mar. 2001 pp. 467–479.

T. A. Thomas, Fred W. Vook, Kevin L Baum, "*Least-Squares Multi–User Frequency–Domain Channel Estimation for Broadband Wireless Communication Systems,*" 37th Allerton Conference, Monticello, IL, Sep. 1999, 10 pages.

* cited by examiner

Primary Examiner—Edward F. Urban
Assistant Examiner—Lana Le
(74) Attorney, Agent, or Firm—Kenneth A. Haas (57) ABSTRACT

The invention provides a method of determining an adaptive channel estimation by providing a channel estimate, determining at least one channel condition, and determining an adapted channel estimate as a function of the channel estimate and the channel condition.

8 Claims, 4 Drawing Sheets